US008018707B2

(12) United States Patent
Yaworski et al.

(10) Patent No.: US 8,018,707 B2
(45) Date of Patent: Sep. 13, 2011

(54) HIGH AMPERAGE SURGE ARRESTORS

(75) Inventors: Harry George Yaworski, Apex, NC (US); Sherif Kamel, Cary, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 137 days.

(21) Appl. No.: 12/434,176

(22) Filed: May 1, 2009

(65) Prior Publication Data

US 2010/0149715 A1 Jun. 17, 2010

Related U.S. Application Data

(60) Provisional application No. 61/121,691, filed on Dec. 11, 2008.

(51) Int. Cl.
*H02H 1/00* (2006.01)

(52) U.S. Cl. ........................................ 361/127; 361/117

(58) Field of Classification Search .......... 361/117–120, 361/127
See application file for complete search history.

(56) References Cited

U.S. PATENT DOCUMENTS 4,161,012 A * 7/1979 Cunningham ................ 361/128
5,088,001 A * 2/1992 Yaworski et al. ............ 361/127
5,114,357 A * 5/1992 Luzzi ............................ 439/183
5,128,824 A 7/1992 Yaworski et al.
7,381,103 B2 6/2008 Luzzi
7,431,599 B2 10/2008 Luzzi

FOREIGN PATENT DOCUMENTS

DE 4408818 C1 5/1995
EP 1801928 A1 6/2007

OTHER PUBLICATIONS

International Search Report and Written Opinion of the International Searching Authority for corresponding PCT application No. PCT/US2009/066954 dated Mar. 30, 2010.

* cited by examiner

*Primary Examiner* — Danny Nguyen
(74) *Attorney, Agent, or Firm* — Myers Bigel Sibley & Sajovec

(57) ABSTRACT

Embodiments of the present invention include a T-body elbow arrestor having an elbow body. A surge arrestor is positioned in one portion of the elbow body extending from an intermediate portion of another portion of the elbow body. An end cap assembly is coupled to the elbow body that is electrically connected to the surge arrestor. A bushing receiving region is positioned in the elbow body extending from the intermediate section towards a first end of the elbow body that is configured to receive a bushing. An insulating plug is positioned in the elbow body extending from the intermediate section towards a second, opposite end of the elbow body. The insulating plug has an end in the intermediate section configured to be coupled to the bushing to secure the T-body elbow arrestor in an assembled condition.

20 Claims, 4 Drawing Sheets

HIGH AMPERAGE SURGE ARRESTORS

RELATED APPLICATIONS

The present application claims the benefit of and priority from U.S. Provisional Application No. 61/121,691, filed Dec. 11, 2008, the disclosure of which is hereby incorporated herein in its entirety by reference.

BACKGROUND OF THE INVENTION

The present invention relates to surge arrestors and, more particularly, to T-body elbow arrestors.

As described in U.S. Pat. No. 5,128,824, conventional surge arresters used to protect underground and overhead high voltage electrical systems widely employ metal oxide varistor elements to provide either a high or a low impedance current path between the arrester terminals depending on the voltage appearing across the varistor elements themselves. More particularly, at the system's steady state or normal operating voltage, the varistor elements have a relatively high impedance. As the applied voltage is increased, as in response to a lightening strike, their impedance decreases until the voltage appearing across the elements reaches their breakdown voltage, at which point their impedance rapidly decreases towards zero and the varistor elements become highly conductive. In this highly conductive condition, the varistor elements serve to conduct the resulting transient follow-on current to ground. As the transient overvoltage due to the strike and the follow-on current dissipate, the varistor elements' impedance increases effectively removing the short to ground and restoring the varistor elements and electrical system to their normal steady state condition.

Conventional elbow arresters are designed for 200 A load break application and have a 200 A standard interface (bushing) that is not compatible with the 600 A standard interface (bushing). The interfaces may differ not only in shape but in the method of coupling to the bushing. Such an arrangement is illustrated in FIG. 1, where a 600 A bushing extender accommodates a 600/200 A loadbreak reducing tap plug (LRTP), which in turn interfaces to a 200 A elbow arrestor. Thus, for users who need to apply surge protection to 600 A systems, a 200 A load break elbow arrester 50 is used in conjunction with a 600 A/200 A LRTP 40 and a 600 A bushing extender 10. An end 42 of the LRTP 40 is configured to receive a conventional 200 A elbow arrester 50. Furthermore, a coupling member 30 couples the LRTP 40 to a 600 A bushing 20, which is mounted on an apparatus bulkhead 8, in the bushing extender 10. A conventional 200 A detent arrangement 40' is shown for coupling the LRTP 40 to the elbow arrestor 50.

SUMMARY OF THE INVENTION

Embodiments of the present invention include a T-body elbow arrestor having an elbow body. The elbow body has a first longitudinally extending portion and a second longitudinally extending portion. The second portion extends from an intermediate section of the first portion in a generally perpendicular direction to define the T-body. A surge arrestor is positioned in the second portion of the elbow body. An end cap assembly is coupled to an end of the second portion of the elbow body displaced from the first portion, which end cap assembly is electrically connected to the surge arrestor. A bushing receiving region is positioned in the first portion of the elbow body extending from the intermediate section towards a first end of the first portion of the elbow body, which busing receiving region being configured to receive a bushing. An insulating plug is positioned in the first portion of the elbow body extending from the intermediate section towards a second, opposite end of the first portion of the elbow body. The insulating plug has an end in the intermediate section configured to be coupled to the bushing to secure the T-body elbow arrestor in an assembled condition when the T-body elbow arrestor is coupled to the bushing.

In further embodiments, the bushing receiving region is configured to conformably receive a 600 A (amp) standard shaped bushing and the surge arrestor is a metal oxide varistor (MOV) arrestor block stack. The first portion may have a length of about twenty-eight centimeters. The end cap assembly may include an end cap that secures the surge arrestor in the second portion and a ground connection having an end in the second portion that is electrically connected to a first end of the surge arrestor and an opposite end extending from the second portion that is configured to be connected to an external ground.

In other embodiments, a second, opposite end of the surge arrestor positioned proximate the intermediate portion of the first portion of the elbow body is electrically connected to the bushing when the elbow arrestor is coupled to the bushing to define an electrical path from the bushing to the ground connection through the surge arrestor. The bushing may include a screw threaded section thereon in the intermediate section. The screw threaded section of the bushing may be an internal thread and the end of the insulating plug configured to be coupled to the bushing may include a mating external thread configured to be threadably received by the internal thread. The insulating plug may include a coupling component and a plug component and the end of the insulating plug configured to be coupled to the bushing may include the coupling component.

In further embodiments, the elbow body is an elastomer. The elbow body may be EPDM rubber. The surge arrestor may be molded in the second portion of the elbow body.

In yet other embodiments, a 600 A (amp) T-body elbow arrestor includes an electrically shielded elbow body having a first longitudinally extending portion and a second longitudinally extending portion. The second portion extends from an intermediate section of the first portion in a generally perpendicular direction to define the T-body. A metal oxide varistor (MOV) arrestor block stack is positioned in the second portion of the elbow body. An end cap assembly is coupled to an end of the second portion of the elbow body displaced from the first portion. The end cap assembly includes an end cap that secures the MOV arrestor block stack in the second portion and a ground connection having an end in the second portion that is electrically connected to and end of the MOV arrestor block stack and an opposite end extending from the second portion that is configured to be connected to an external ground. A 600 A standard shaped bushing receiving portion is positioned in the first portion of the elbow body extending from the intermediate section towards a first end of the first portion of the elbow body. The receiving portion is configured to receive a bushing that includes a screw threaded section thereon. An insulating plug is positioned in the first portion of the elbow body extending from the intermediate section towards a second, opposite end of the first portion of the elbow body. The insulating plug has an end in the intermediate section configured to be coupled to the screw threaded section of the bushing to secure the 600 A T-body elbow arrestor in an assembled condition when the 600 A T-body elbow arrestor is coupled to the bushing.

In some embodiments, the bushing includes a coupling member and the screw threaded section of the bushing is on the coupling member. The insulating plug may include a coupling component and a plug component and the end of the insulating plug configured to be coupled to the bushing may include the coupling component. The screw threaded section of the bushing may be an internal thread and the end of the insulating plug configured to be coupled to the bushing may include a mating external thread configured to be threadably received by the internal thread.

DETAILED DESCRIPTION OF EMBODIMENTS OF THE INVENTION

Figure 1:
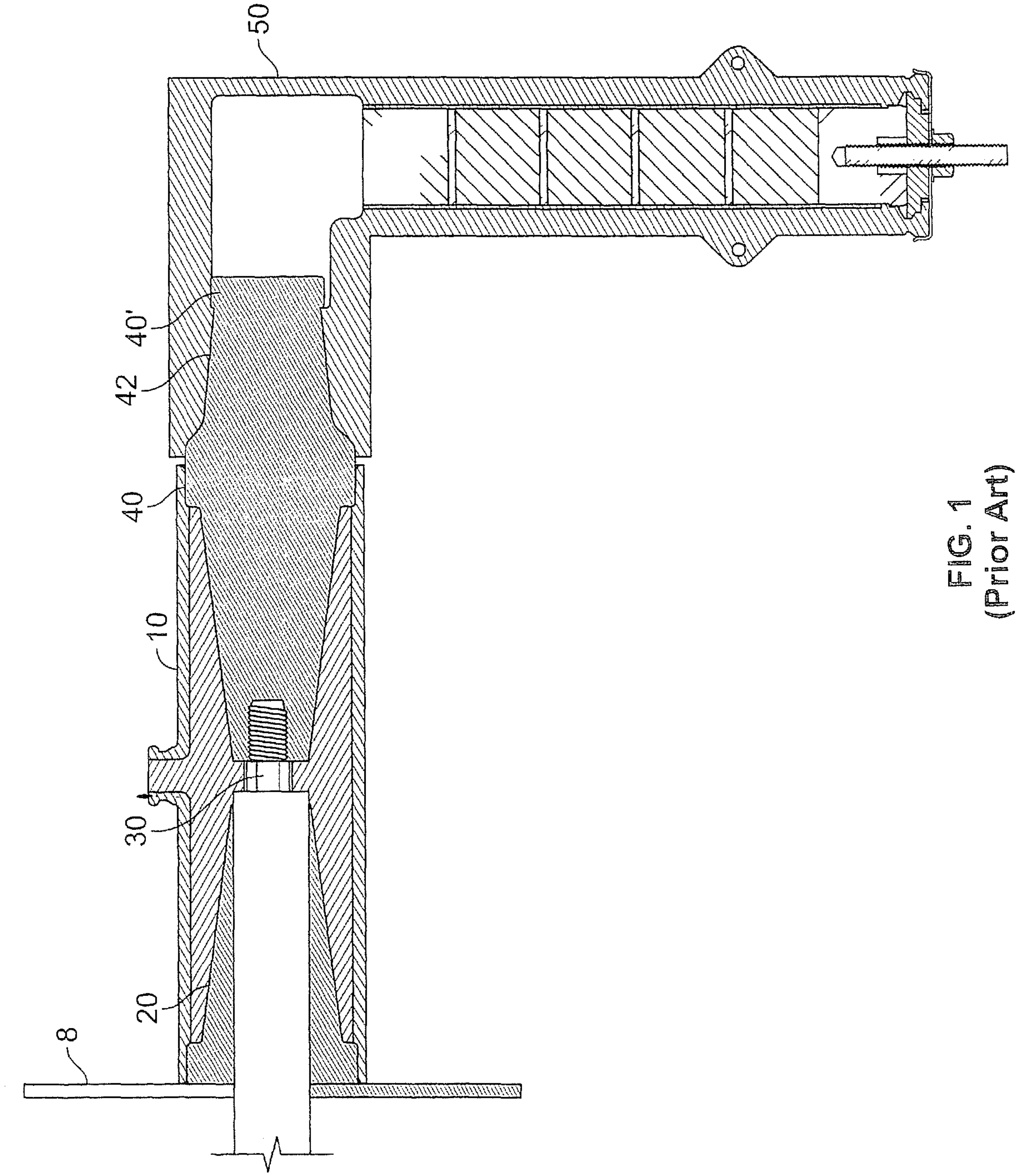
FIG. 1 (Prior Art)
FIG. 1 is a side view illustrating a conventional elbow arrestor arrangement for a 600 A load break application.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as “beneath”, “below”, “lower”, “above”, “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below” or “beneath” other elements or features would then be oriented “above” the other elements or features. Thus, the exemplary term “below” can encompass both an orientation of above and below. The device may be otherwise oriented (rotated 90° or at other orientations) and the spatially relative descriptors used herein interpreted accordingly.

As used herein, the singular forms “a”, “an” and “the” are intended to include the plural forms as well, unless expressly stated otherwise. It will be further understood that the terms “includes,” “comprises,” “including” and/or “comprising,” when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being “connected” or “coupled” to another element, it can be directly connected or coupled to the other element or intervening elements may be present. As used herein, the term “and/or” includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 2:
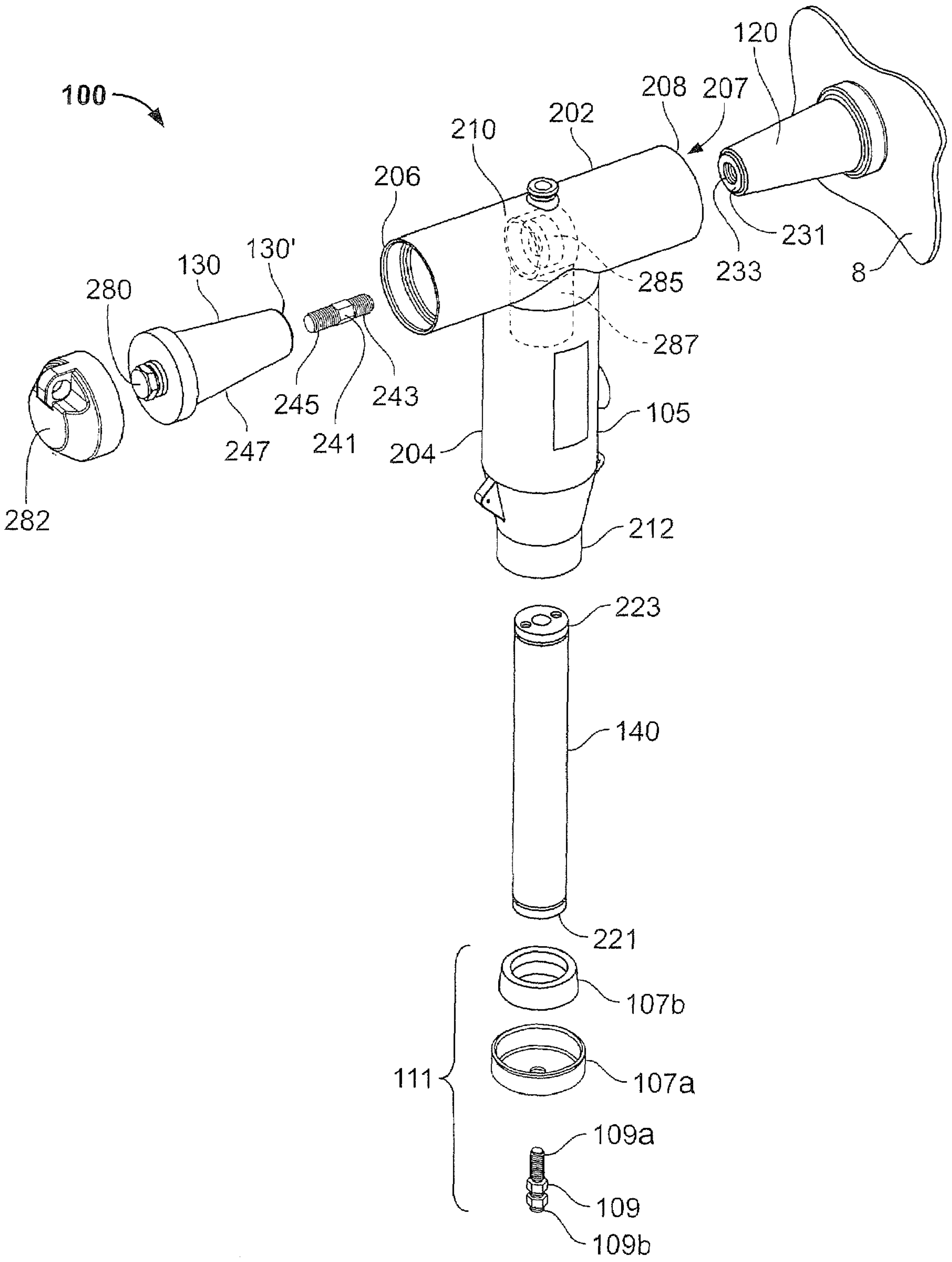
FIG. 2 is an exploded perspective view of an elbow arrestor according to some embodiments of the present invention.
Figure 3:
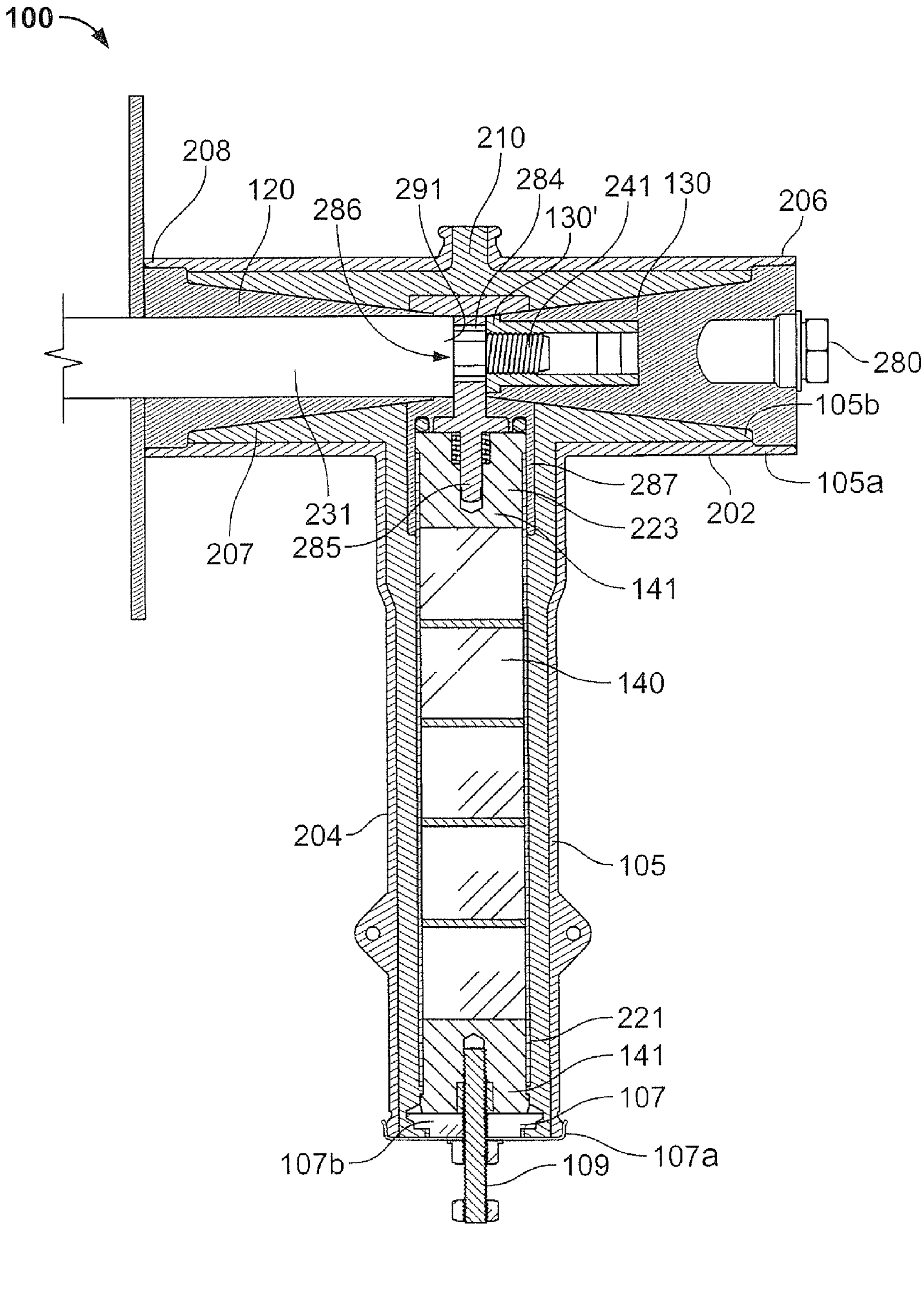
FIG. 3 is a cross-sectional view of the elbow arrestor of FIG. 2 taken along the line 3-3 of FIG. 4.
Figure 4:
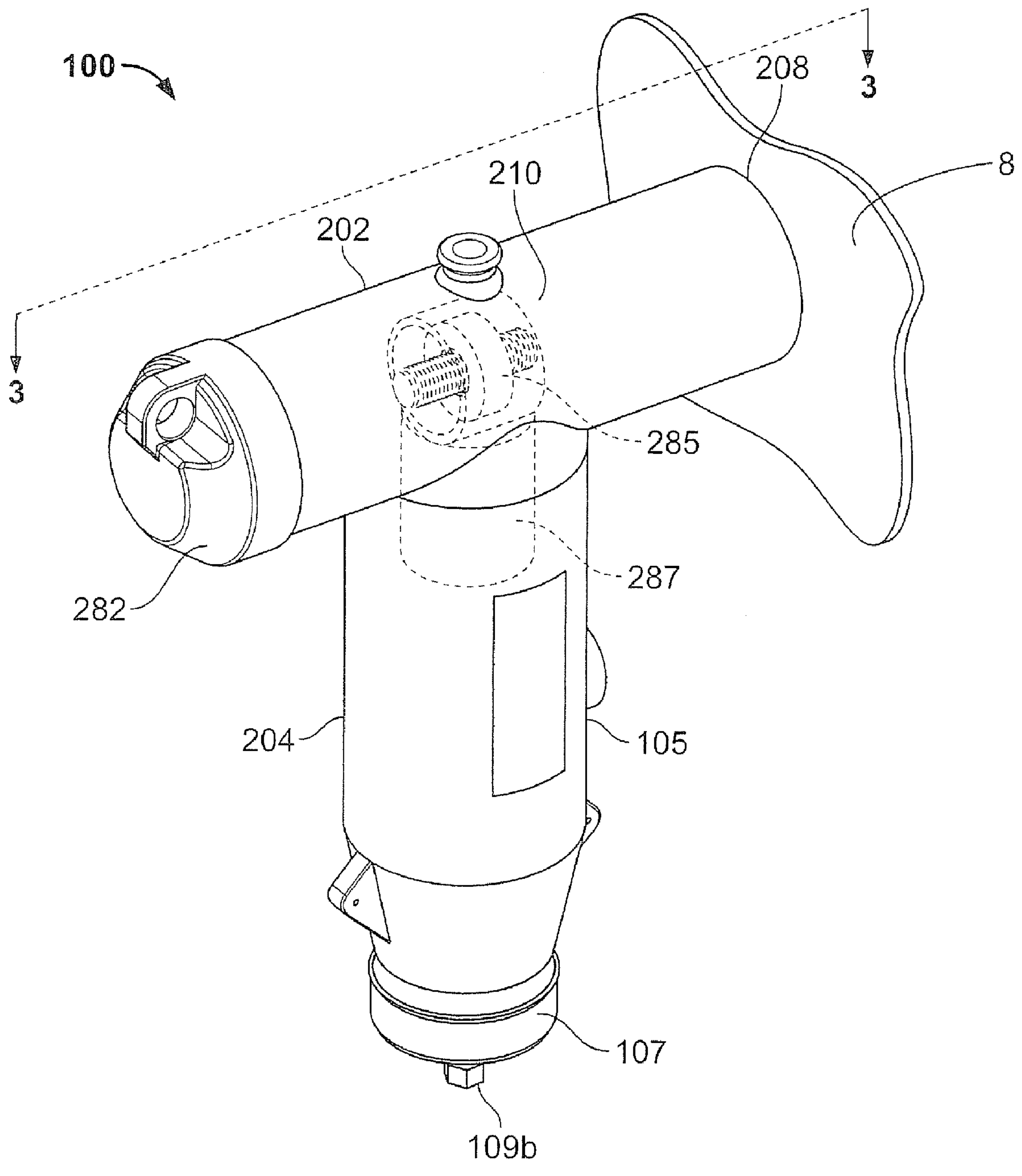
FIG. 4 is a perspective view of the elbow arrestor of FIG. 2 in an assembled condition.

Some embodiments of the present invention provide surge arrestors, such as a 600 ampere (600 A) T-Body elbow arrester as illustrated in FIGS. 2-4. As will be further described herein, the illustrated elbow arrestor may be a shielded elbow manufactured, for example, from an elastomer, such as EPDM rubber. A metal oxide varistor (MOV) arrestor block stack 140 may be inserted and/or molded into an elbow body and an end cap and ground connection (lead assembly) are affixed to the elbow body at the lower end as seen in FIG. 3. Also shown in the embodiments of FIGS. 2-4 are a 600 A insulating plug, which is configured to allow the 600 A insulating plug to be coupled to the 600 A bushing at an end thereof. The 600 A insulating plug 130 may, for example, be coupled to the 600 A bushing internally to the elbow arrestor, such as by engaging the illustrated screw thread on the 600 A bushing (or on a coupling member secured to the 600 A bushing to secure the assembled elbow arrestor in an assembled configuration as seen in FIG. 3. Note that, while the end is illustrated as part of the insulating plug, it may be a separate component coupled between the insulating plug and bushing.

Referring now to FIGS. 2-4, the illustrated embodiments of a T-body elbow arrestor, in particular, a 600 A (amp) T-body elbow arrestor 100, includes an elbow body 105. The elbow body 105 has a first longitudinally extending portion 202 and a second longitudinally extending portion 204 that extends from an intermediate section 210 of the first portion 202 in a generally perpendicular direction to define the T-body. In some embodiments, the first portion 202 has a length of about twenty-eight centimeters.

The elbow body 105 may be an electrically shielded elbow body. As such, the elbow body may be an elastomer, such as EPDM rubber or the like. More particularly, as seen in the embodiments of FIG. 3, the elbow body 105 includes an inner portion **105*b* that may be an insulating EPDM and an outer portion 105*a* that may be conductive EPDM. In some embodiments, all of the outer components other than external electrical connection points may be electrically shielded so that the entire elbow arrestor 100** will be electrically shielded.

A surge arrestor, shown as a metal oxide varistor (MOV) arrestor block stack 140, is positioned in the second portion 204 of the elbow body 105. The illustrated MOV arrestor block stack includes five MOV blocks with aluminum end fittings 141 on the top and the bottom of the MOV arrestor block stack 140.

An end cap assembly 111 is coupled to an end 212 of the second portion 204 of the elbow body 105. The end cap assembly 111 includes an electrical connection to the surge arrestor and may further help to retain the MOV arrestor block stack 140 in the elbow body 105. In the illustrated embodiments, the end cap assembly 111 includes an end cap **107*a*, 107*b* that secures the MOV arrestor stack block 140 in the second portion 204 and a ground connection 109 having an end 109_a_ in the second portion 204 that is electrically connected to a first end 221 of the MOV arrestor stack block 140. An opposite end 109_b_ of the ground connection 109 extends from the second portion 204 and is configured to be connected to an external ground. The ground connection 109 may be a brass ground fitting and the outer section 107_b_ of the end cap 107_a_, 107_b_ may be stainless steel in some embodiments. The ground connection 109 is electrically connected to the MOV arrestor block stack 140 through the conductive aluminum end fitting 141 on the bottom end (end 212 of the second portion 204) of the MOV arrestor block stack 140. In some embodiments, the MOV arrestor stack block 140 is molded in the second portion 204 of the elbow body 105**.

A bushing receiving region 207 is located in the first portion 202 of the elbow body 105 extending from the intermediate section 210 towards a first end 208 of the first portion 202. The bushing receiving region 207, in the illustrated embodiments, is configured to conformably receive a 600 A (amp) standard shaped bushing 120.

An insulating plug 130 is positioned in the first portion 202 of the elbow body 105 extending from the intermediate section 210 towards a second, opposite end 206 of the first portion 202. The insulating plug 130 has an end 130' in the intermediate section 210 that is configured to be coupled to the bushing 120 to secure the T-body elbow arrestor 100 in an assembled condition when the T-body elbow arrestor 100 is coupled to the bushing 120.

For the illustrated embodiments, a second, opposite end 223 of the MOV arrestor stack block 140 positioned proximate the intermediate portion 210 of the first portion 202 of the elbow body 105 is electrically connected to the bushing 120 when the elbow arrestor 100 is coupled to the bushing 120 to define an electrical path from the bushing 120 to the ground connection 109 through the MOV arrestor block stack 140. More particularly, as shown in the embodiments of FIG. 3, a conductive contact 285, which may be aluminum, is positioned in the intermediate portion 210. The conductive contact 285 is electrically connected to the MOV arrestor block stack 140 through the upper conductive aluminum end fitting 141. An opening through the conductive contact 285 is sized to allow the coupling component 241 to be received therein and to be freely rotatable therein to couple the elbow arrestor 100 to the bushing 120. When the elbow arrestor 100 is coupled to the bushing 120, a face 284 of the conductive contact 285 is pressed into contact with the adjacent face of the conductive core 231 of the bushing 120 to provide an electrical pathway from the bushing 120 to the MOV arrestor block stack 140. Also shown in the embodiments of FIG. 3 is an additional section 287 of the elbow body 105. The additional section 287 and the inner portion 107_b_ of the end cap 107_a_, 107_b_ may be conductive EPDM.

As also shown in FIGS. 2 and 3, the insulating plug 130 includes a coupling component 241 and a plug component 247. The end 130' of the insulating plug 130 configured to be coupled to the bushing 120 includes the coupling component 241. The bushing 120 includes a conductive core 231 having a screw threaded section 233 thereon that is positioned in the intermediate section 210 when the elbow arrestor 100 receives the bushing 120. The screw threaded section 233 of the bushing 120 is shown as an internal thread and the coupling component 241 has an end 243 with a mating external thread configured to be threadably received by the internal thread of section 233. An opposite end 245 of the coupling component 241 is configured to be coupled to the plug component 247 so that rotation of a drive head 280 provided on the insulating plug 130 allows the elbow arrestor 100 to be connected to and disconnected from the bushing 120.

Also shown in FIGS. 2-3 is a protective cover 282 that may be positioned over the insulating plug 130 after attaching the elbow arrestor 100 to the bushing 120. The protective cover 282, like the elbow body 105, may be electrically shielded and may be one of the components providing an elbow arrestor 100 that is fully electrically shielded. The protective cover 282 may be a same material as the elbow body 105.

Embodiments of the present invention, such as the illustrated 600 A T-Body elbow arrester 100 of FIGS. 2-4 may reduce the number of components, may be easier to install, may be less costly, and may have a shorter stacking height than the current elbow arrester configuration seen in FIG. 1. For example, in some embodiments, the stack height (from left to right as seen in the figures) may be about eleven inches, as compared to about twenty-five inches for the arrangement of FIG. 1. The 600 A/200 A loadbreak reducing tap plug 40 and the bushing extenders 10 are extra components with extra cost and complexity. The stacking height of the reducing tap plug 40, the 600 A bushing extender 10, and the 200 A elbow arrester 50 also causes cantilever forces, which are generally undesirable.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A T-body elbow arrestor, comprising:

an elbow body having a first longitudinally extending portion and a second longitudinally extending portion, wherein the second portion extends from an intermediate section of the first portion in a generally perpendicular direction to define the T-body;

a surge arrestor positioned in the second portion of the elbow body;

an end cap assembly coupled to an end of the second portion of the elbow body displaced from the first portion, the end cap assembly being electrically connected to the surge arrestor;

a bushing receiving region positioned in the first portion of the elbow body extending from the intermediate section towards a first end of the first portion of the elbow body, the bushing receiving region being configured to receive a bushing; and an insulating plug positioned in the first portion of the elbow body extending from the intermediate section towards a second, opposite end of the first portion of the elbow body, wherein the insulating plug has an end in the intermediate section configured to be coupled to the bushing to secure the T-body elbow arrestor in an assembled condition when the T-body elbow arrestor is coupled to the bushing.

2. The elbow arrestor of claim 1, wherein the bushing receiving region is configured to conformably receive a 600 A (amp) standard shaped bushing and wherein the surge arrestor comprises a metal oxide varistor (MOV) arrestor block stack.

3. The elbow arrestor of claim 1, wherein the first portion has a length of about twenty-eight centimeters.

4. The elbow arrestor of claim 1, wherein the end cap assembly includes an end cap that secures the surge arrestor in the second portion and a ground connection having an end in the second portion that is electrically connected to a first end of the surge arrestor and an opposite end extending from the second portion that is configured to be connected to an external ground.

5. The elbow arrestor of claim 4, wherein a second, opposite end of the surge arrestor positioned proximate the intermediate portion of the first portion of the elbow body is electrically connected to the bushing when the elbow arrestor is coupled to the bushing to define an electrical path from the bushing to the ground connection through the surge arrestor.

6. The elbow arrestor of claim 1, wherein the bushing includes a screw threaded section thereon in the intermediate section.

7. The elbow arrestor of claim 6, wherein the screw threaded section of the bushing comprises an internal thread and the end of the insulating plug configured to be coupled to the bushing includes a mating external thread configured to be threadably received by the internal thread.

8. The elbow arrestor of claim 1, wherein the insulating plug includes a coupling component and a plug component and wherein the end of the insulating plug configured to be coupled to the bushing includes the coupling component.

9. The elbow arrestor of claim 1, wherein the elbow body comprises an elastomer.

10. The elbow arrestor of claim 9, wherein the elbow body comprises EPDM rubber.

11. The elbow arrestor of claim 1, wherein the surge arrestor is molded in the second portion of the elbow body.

12. A 600 A (amp) T-body elbow arrestor, comprising:

an electrically shielded elbow body having a first longitudinally extending portion and a second longitudinally extending portion, wherein the second portion extends from an intermediate section of the first portion in a generally perpendicular direction to define the T-body;

a metal oxide varistor (MOV) arrestor block stack positioned in the second portion of the elbow body;

an end cap assembly coupled to an end of the second portion of the elbow body displaced from the first portion, wherein the end cap assembly includes an end cap that secures the MOV arrestor block stack in the second portion and a ground connection having an end in the second portion that is electrically connected to and end of the MOV arrestor block stack and an opposite end extending from the second portion that is configured to be connected to an external ground;

a 600 A standard shaped bushing receiving portion positioned in the first portion of the elbow body extending from the intermediate section towards a first end of the first portion of the elbow body that is configured to receive a bushing that includes a screw threaded section thereon; and an insulating plug positioned in the first portion of the elbow body extending from the intermediate section towards a second, opposite end of the first portion of the elbow body, wherein the insulating plug has an end in the intermediate section configured to be coupled to the screw threaded section of the bushing to secure the 600 A T-body elbow arrestor in an assembled condition when the 600 A T-body elbow arrestor is coupled to the bushing.

13. The elbow arrestor of claim 12, wherein the bushing includes a coupling member and wherein the screw threaded section of the bushing is on the coupling member.

14. The elbow arrestor of claim 13, wherein the insulating plug includes a coupling component and a plug component and wherein the end of the insulating plug configured to be coupled to the bushing includes the coupling component.

15. The elbow arrestor of claim 12, wherein the screw threaded section of the bushing comprises an internal thread and the end of the insulating plug configured to be coupled to the bushing includes a mating external thread configured to be threadably received by the internal thread.

16. The elbow arrestor of claim 12, wherein the first portion has a length of about twenty-eight centimeters.

17. The elbow arrestor of claim 12, wherein the elbow body comprises an elastomer.

18. The elbow arrestor of claim 17, wherein the elbow body comprises EPDM rubber.

19. The elbow arrestor of claim 12, wherein the MOV arrestor block stack is molded in the second portion of the elbow body.

20. The elbow arrestor of claim 12, wherein a second, opposite end of the MOV arrestor block stack positioned proximate the intermediate portion of the first portion of the elbow body is electrically connected to the bushing when the elbow arrestor is coupled to the bushing to define an electrical path from the bushing to the ground connection through the MOV arrestor block stack.

* * * * *